United States Patent [19]
Telecky, Jr.

[11] Patent Number: 4,755,905
[45] Date of Patent: Jul. 5, 1988

[54] VEHICLE VELOCITY SENSING APPARATUS AND METHOD

[75] Inventor: Frederick J. Telecky, Jr., Dallas, Tex.

[73] Assignee: Caterpillar Industrial Inc., Mentor, Ohio

[21] Appl. No.: 935,366

[22] Filed: Nov. 26, 1986

[51] Int. Cl.[4] .................. H01H 47/00; G01P 3/46
[52] U.S. Cl. .................................. 361/236; 324/163
[58] Field of Search .................. 361/236; 324/163

[56] References Cited

U.S. PATENT DOCUMENTS

| | | | |
|---|---|---|---|
| 4,152,645 | 5/1979 | Bendler | 324/163 |
| 4,199,719 | 4/1980 | Grob | 324/166 |
| 4,268,792 | 5/1981 | Grob | 328/24 |
| 4,355,364 | 10/1982 | Gudat | 364/565 |
| 4,369,651 | 1/1983 | Szentes | 73/119 A |
| 4,506,339 | 3/1985 | Kuhnlein | 324/163 |
| 4,529,932 | 7/1985 | Doueihi et al. | 324/161 |

FOREIGN PATENT DOCUMENTS 2157830 10/1985 United Kingdom ............... 324/163

Primary Examiner—L. T. Hix
Assistant Examiner—David Porterfield
Attorney, Agent, or Firm—Stephen L. Noe

[57] ABSTRACT

Automatic guided vehicles require an accurate method and apparatus for determining vehicle velocity. The subject apparatus is associated with a vehicle having at least one surface engaging idler wheel. A resolver produces a rotation angle rate signal having a value responsive to the angular rotation rate of the idler wheel. A resolver-to-digital converter receives the rotation rate angle signal and produces a rotation rate pulse signal. A clock substantially continuously produces clock pulse signals having a predetermined frequency. A counter receives the rotation rate pulse signal and the clock pulse signal and controllably produces a time signal corresponding to the number of clock pulses received over the duration of a predetermined portion of the rotation rate pulse signal. A logic device controllably receives the time signal and produces a vehicle velocity signal.

3 Claims, 2 Drawing Sheets

VEHICLE VELOCITY SENSING APPARATUS AND METHOD

DESCRIPTION

1. Technical Field

This invention relates generally to an apparatus and method for determining vehicle velocity, and more particularly, to an apparatus and method for determining the velocity of a vehicle utilizing the rate of angular rotation of a wheel of said vehicle.

2. Background Art

Various devices for determining vehicle speed or velocity are in common use today. Such devices commonly provide a crude but adequate indication of vehicle velocity. However, such devices are not satisfactory for use where precise determination of vehicle velocity is required.

Such precision is made necessary by the recent application of advanced technology to provide automatic guided vehicles in industrial complexes. Such automatic guided vehicles of necessity require information regarding their precise location within a particular facility. Such information must include an accurate representation of vehicle velocity obtained at frequent intervals during the vehicle's travel.

Such accurate determination of velocity is not available with systems in common use today. Furthermore, it is desirable that vehicle velocity be determined without the addition of expensive and/or redundant components and devices to those already existing on typical automatic guided vehicles.

The present invention is directed to overcoming one or more of the problems as set forth above.

DISCLOSURE OF THE INVENTION

In one aspect of the present invention, a velocity determining apparatus for a vehicle having at least one surface engaging wheel is provided. The apparatus includes a resolver having a shaft rotatably connected to the wheel. The resolver is adapted to produce a rotation angle rate signal having a value responsive to the angular rotation rate of the wheel. A resolver-to-digital converter receives the rotation angle rate signal and produces a rotation rate pulse signal having a pulse duration responsive to the angular rotation rate. A clock substantially continuously produces a clock pulse signal having a predetermined frequency. A counter receives the rotation rate pulse signal and the clock pulse signal and controllably produces a time signal corresponding to the number of clock pulses received from the clock over the duration of a predetermined portion of the rotation rate pulse signal. A logic device controllably receives the time signal and produces a velocity signal having a value responsive to the time signal.

In a second aspect of the present invention, a method for determining the velocity of a vehicle is provided. The vehicle includes at least one surface engaging wheel, and a resolver having a shaft rotatably connected to the wheel. A rotation angle rate signal is produced having a value responsive to the angular rotation rate of the wheel. A rotation rate pulse signal is produced having a pulse duration responsive to the angular rotation rate. A clock signal is produced having a predetermined frequency. A time signal is produced corresponding to the number of clock pulses received over the duration of a predetermined portion of the rotation rate pulse signal, and a velocity signal is produced in response to the value of the time signal.

The present invention provides an apparatus and method for determining vehicle velocity that is highly accurate, and that does not require the addition of expensive velocity determining components to an existing automatic guided vehicle.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
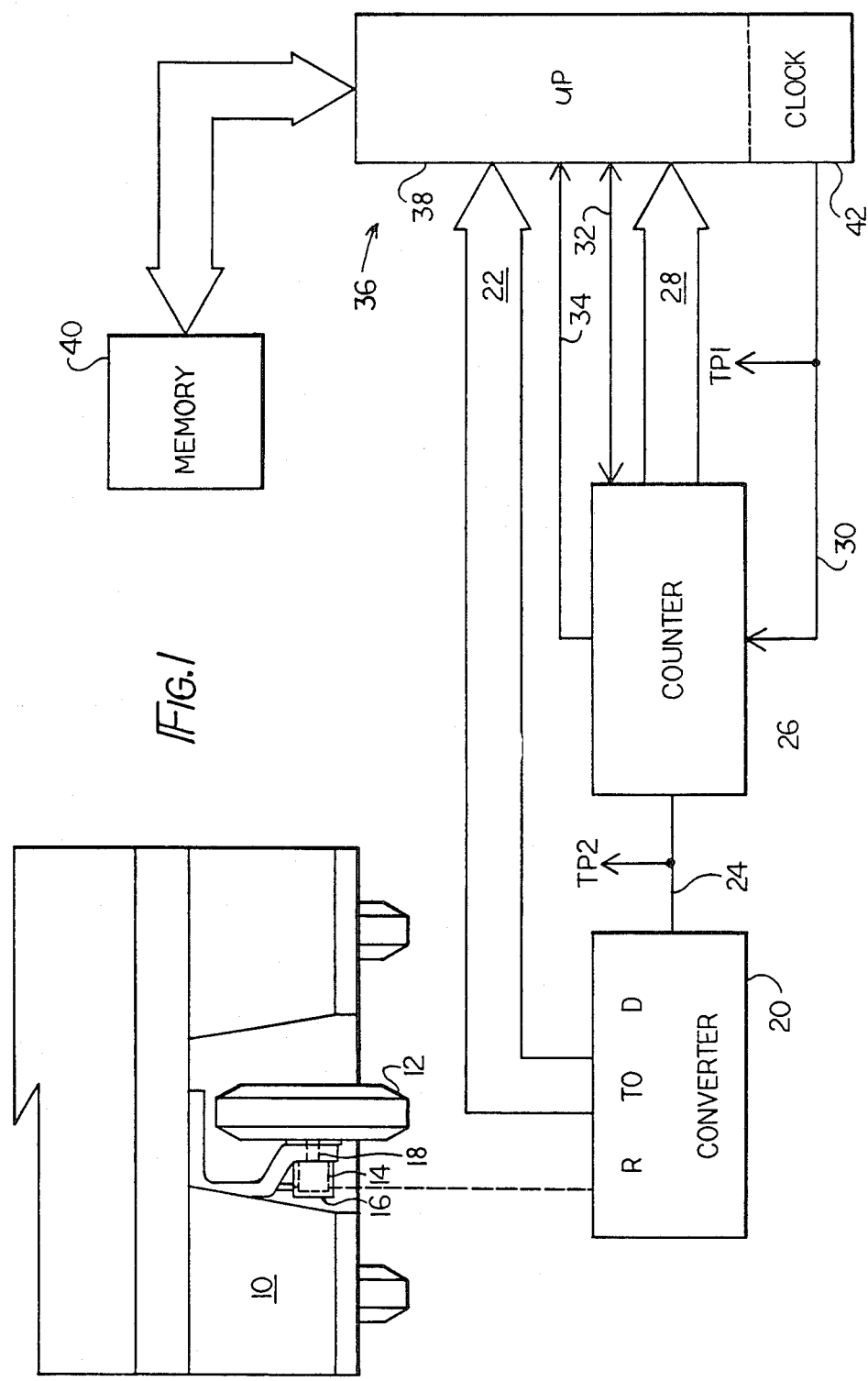
FIG. 1 is a schematized representation of one embodiment of the present invention.

Referring first to FIG. 1, an apparatus embodying certain of the principles of the present invention is associated with a vehicle 10 having at least one surface engaging wheel 12. In a particular embodiment of the present invention, the wheel 12 is, for example, the steerable wheel of a three wheeled automatic guided vehicle. In any event, it is desirable that the wheel 12 not be a driven wheel susceptible to slip.

Associated with the wheel 12 is a resolver 14. The resolver 14 is mounted within an enclosure 16, and includes a shaft 18 rotatably connected to the wheel 12.

The resolver 14 is electrically connected to a resolver-to-digital converter 20. The resolver-to-digital converter 20 is of conventional design, for example, according to Model No. 1S4510 produced by Analog Devices Inc. The resolver-to-digital converter 20 accepts the analog signals produced by the resolver 14 in response to rotation of the wheel 12, and produces a multi-bit pulse duration signal on an output bus 22. In addition, at least one of the multi-bit signals, for example, the least significant bit, is delivered to an output line 24.

The output line 24 is connected to a counter means 26. The counter means 26 is, for example, a part number 6840 manufactured by Motorola Corporation. The counter means 26 includes an output bus 28, a clock input line 30, a reset input line 32, and a status output line 34.

A logic means 36 includes, in the preferred embodiment, a microprocessor 38 associated with a memory device 40. The microprocessor 38 includes a clock means 42. The clock means 42 is connected to the counter 26 via the clock input line 30. The microprocessor 38 is connected to the counter 26 via the counter output bus 28, the reset line 32, and the status line 34. In addition, the microprocessor 38 is connected to the resolver-to-digital converter 20 via the output bus 22.

Figure 2:
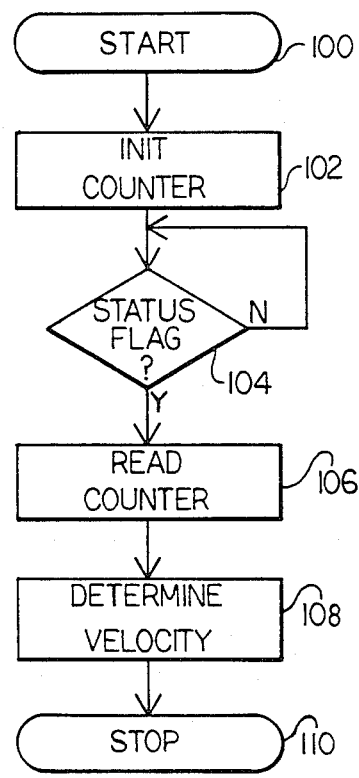
FIG. 2 is a flowchart representing software used with one embodiment of the present invention.
Figure 3:
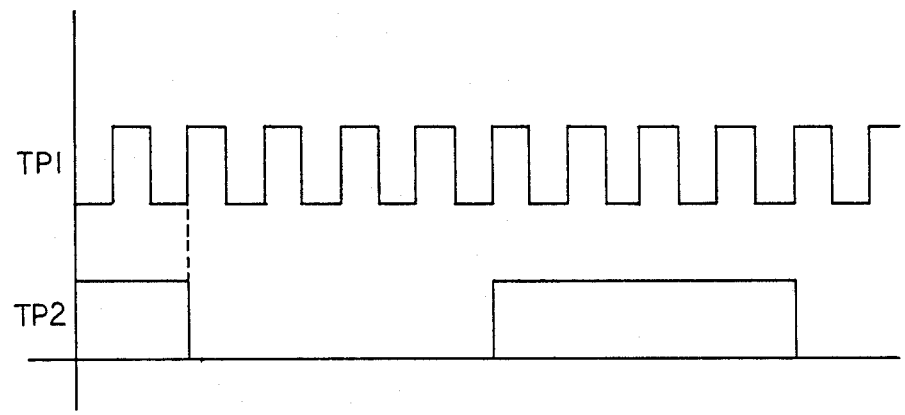
FIG. 3 is a graphic representation of waveforms associated with the embodiment of FIG. 1.

Waveforms associated with the embodiment of the present invention shown in FIG. 1, are depicted in FIG. 3. The waveforms are respectively associated with the test points indicated on the clock input line 30 and the resolver-to-digital converter output line 24. In addition, in the preferred embodiment, the microprocessor 38 has associated with it a software program depicted in flowchart form in FIG. 2.

INDUSTRIAL APPLICABILITY

With reference to the drawings, the wheel 12 is rotatable in response to movement of the vehicle 10. Angular rotation of the wheel 12 likewise results in rotation of the shaft 18 of the resolver 14. The resolver 14 responsively produces a rotation angle rate signal having a value responsive to the angular rotation rate of the wheel 12.

The rotation angle rate signal is received by the resolver-to-digital converter 24, which responsively produces a multi-bit rotation rate signal having pulse durations responsive to the rotation angle rate. In a typical automatic guided vehicle, the rotation rate pulse signals are delivered via the output bus 22 to the logic means 36, where they are used to determine the distance the vehicle 10 has traveled. The signal delivered to the logic means via the output bus 22 actually represents the angular rotation rate of the wheel 12. By utilizing a wheel 12 having a known diameter, the distance traveled during a single rotation pulse is readily calculated by the logic means 36, by dividing the idler wheel diameter by the number of rotation rate pulses produced by the resolver-to-digital converter 20 over an entire revolution of the wheel 12. For example, assuming that the resolver-to-digital converter 20 produces $2^{14}$ pulses per complete revolution, the distance traveled by the vehicle 10 over a single pulse delivered from the resolver-to-digital converter 20 equals 0.00038 radians. Given the diameter of the wheel 12, the radians per pulse is readily converted to actual distance traveled.

Once the distance traveled by the vehicle 10 per pulse or least significant bit produced by the resolver-to-digital converter 20 is known, it is possible to determine the velocity at which the vehicle 10 is traveling if the time per pulse delivered from the resolver-to-digital converter 20 is determined. Such determination is accomplished by utilizing the counter means 26 in conjunction with the logic means 36. Each rotation rate pulse signal is delivered from the resolver-to-digital converter 20 via the output line 24 to the counter means 26. This rotation rate pulse signal is depicted in FIG. 3 at TP2. In addition, a continuous clock signal consisting of clock pulses at a predetermined frequency is delivered from the clock means 42 via the clock input line 30 to the counter means 26.

According to the flowchart of FIG. 2, each time it is necessary to determine vehicle velocity, the microprocessor 38 progresses through the flowchart beginning at the "START" block 100. The counter means 26 is first initialized in the block 102 by delivering a reset signal from the microprocessor 38 to the counter means 26 via the reset line 32. This reset signal clears the counter registers and prepares the counter means 26 to accumulate clock pulse signals.

The counter means 26 is now enabled and prepared to count the clock pulse signals received via the clock input line 30. However, counting is not begun until the leading edge of a rotation rate pulse signal is received via the line 24. In other words, the counter means 26 is triggered to begin counting clock pulses upon receiving the negative going pulse from the resolver-to-digital converter 20, as shown at TP2 in the waveforms. The counter means 26 accumulates the clock pulses received from the clock means 42 until the rotation rate pulse signal received from the resolver-to-digital converter 20 ceases, as denoted by the positive going edge of the signal at TP2. In response to ending the count of clock pulses, the counter means 26 produces a status signal on the status line 34.

In the preferred embodiment of the invention, the clock pulses delivered from the clock means 42 are of a predetermined frequency, for example, one megahertz. Therefore, the number of clock pulses counted by the counter means 26 over the duration of one rotation rate pulse from the resolver-to-digital converter 20 is equal to the number of microseconds the rotation rate pulse is present. Of course, the utilization of one microsecond pulses is for convenience sake, and other predetermined frequencies could be utilized in conjunction with appropriate scaling factors.

Upon receiving the status flag from the counter means 26 in the block 104, the microprocessor 38 reads the content of the counter means 26 via the output bus 28. This is accomplished in the block 106. The logic means 36 utilizes this time signal to produce a velocity signal having a value responsive to the time signal. In one embodiment, the memory element 40 includes a look up table having a plurality of rotational velocity signal values, each corresponding to a respective time signal. Therefore, the velocity of the vehicle 10 can readily be determined by merely accessing the appropriate memory location of the memory element 40 utilizing the value of the time signal as the address of the desired memory location.

Alternatively, the logic means 36 can be programmed in a conventional manner to determine the velocity in accordance with the formula $$V = (R\theta) \div T$$

where R equals the radius of the wheel 12, $\theta$ equals the magnitude of angular rotation of the wheel 12 sufficient to produce a single rotation rate pulse signal, T equals the value of the time signal, and V equals the rotational velocity of the wheel 12.

Regardless of which manner of determining vehicle velocity is utilized, the accuracy and resolution of the velocity determining apparatus is quite high. For example, assuming a wheel radius of 0.2266 meters, and a counter means 26 having a 16 bit capacity, the range of velocity measurement is from a low of 0.0013 meters per second to a high of 86.89 meters per second. This range exceeds that necessary to control automatic guided vehicles.

The look up table referred to above is, of course, constructed utilizing the preceding formula. Substituting the numbers from the example just given, vehicle velocity equals 86.89 divided by the number of clock pulses counted during any single pulse delivered from the resolver-to-digital converter 20. For example, assuming that 174 clock pulses are counted during a single rotation pulse duration, the calculated velocity equals 0.5 meters per second. Therefore, in the look up table, location 174 contains the value 0.5. Corresponding velocity values can be included in the look up table having increments of whatever size is desired for a particular application.

Once the velocity is determined in the block 108, the program module ends at the block 110 and the logic means 36 proceeds with other vehicle control tasks. The determined vehicle velocity can be used in various ways for control purposes by the logic means 36, and/or can be displayed for the convenience of attendent personnel. The potential utilization of the vehicle velocity signal does not form a portion of the instant invention, and is not further discussed herein.

Other aspects, objects, advantages, and uses of this invention can be obtained from a study of the drawings, the disclosure, and the appended claims.

I claim:

1. A velocity determining apparatus for a vehicle, said vehicle having at least one surface engaging wheel, comprising:

resolver means for producing a rotation angle rate signal having a value responsive to the angular rotation rate of said wheel, said resolver means having a shaft rotatably connected to said wheel;

converter means for receiving said rotation angle rate signal and producing a rotation rate pulse signal having a pulse duration responsive to said rotation angle rate signal;

clock means for substantially continuously producing a clock pulse signal having a predetermined frequency;

counter means for receiving said rotation rate pulse signal and said clock pulse signal and controllably producing a numeric time signal corresponding to the number of clock pulses received from said clock means over the duration of a predetermined portion of said rotation rate pulse signal and a status signal in response to termination of said predetermined portion of said rotation rate pulse signal; and logic means for controllably receiving said numeric time signal and producing a velocity signal in response to receiving said status signal, said velocity signal having a value responsive to said time signal.

2. A velocity determining apparatus, as set forth in claim 1, wherein said logic means includes a memory element having a look up table, said look up table including a plurality of rotational velocity signal values, each corresponding to a respective one of said numeric time signals.

3. A velocity determining apparatus, as set forth in claim 1, wherein said logic means produces said velocity signal responsive to the formula $V = (R\theta) \div T$ where 'R equals the radius of said wheel, $\theta$ equals the magnitude of angular rotation of said wheel sufficient to produce a single rotation rate pulse signal, T equals the value of said numeric time signal, and V equals the rotational velocity of said wheel.

* * * * *